United States Patent

Lensner et al.

[15] 3,707,651

[45] Dec. 26, 1972

[54] FREQUENCY SHIFTED MODULATED CARRIER PROTECTIVE RELAYING SYSTEM WITH AMPLITUDE MODULATED VOICE COMMUNICATION

[72] Inventors: Herbert W. Lensner, East Orange; Roger E. Ray, Parsippany, both of N.J.

[73] Assignee: Westinghouse Electric Corporation, Pittsburgh, Pa.

[22] Filed: June 29, 1971

[21] Appl. No.: 157,880

[52] U.S. Cl. ................317/28 R, 178/71 T, 325/182

[51] Int. Cl. ................................................H02h 7/26

[58] Field of Search...........317/28 R; 325/5, 13, 182; 178/71 T

[56] References Cited

UNITED STATES PATENTS

| | | | |
|---|---|---|---|
| 3,040,130 | 6/1962 | Hughes | 178/71 T |
| 3,470,418 | 9/1969 | Hagberg et al. | 317/28 |
| 3,590,324 | 6/1971 | Rockefeller | 317/28 R |
| 3,602,776 | 8/1971 | Gonnam | 317/28 R |

*Primary Examiner*—James D. Trammell
*Attorney*—A. T. Stratton et al.

[57] ABSTRACT

Relaying apparatus using a carrier wave which shifts frequency to perform its relaying function and which carrier wave is amplitude modulated, at frequencies greater than the shift frequency of the wave, to provide a voice channel which has no effect on the relaying operation; the lower frequency magnitudes of the voice frequencies being attenuated so that the amplitude modulation of the wave is solely at frequencies higher than the shift frequency of the frequency modulated wave; the ringing frequency being selected to be above the magnitude of the shift in frequency and below the attenuated voice frequencies.

17 Claims, 7 Drawing Figures

WITNESSES

Donald Moore

James F. Young

INVENTORS

Herbert W. Lensner &

Roger E. Ray

BY John L. Stoughton

ATTORNEY

FREQUENCY SHIFTED MODULATED CARRIER PROTECTIVE RELAYING SYSTEM WITH AMPLITUDE MODULATED VOICE COMMUNICATION

BRIEF SUMMARY OF THE INVENTION

The invention herein is directed towards an audio amplitude modulated frequency shifted relaying carrier wave for transmitting voice on the relaying carrier wave and which comprises attenuating all of the voice frequencies which might contribute side bands having a frequency which is equal to or less than the magnitude of the shift in the frequency of the modulated wave whereby any interaction between the relaying and the voice function of the relaying apparatus is eliminated. Additionally a ringing or calling signal is provided to amplitude modulate the carrier wave at a frequency above the relaying frequencies and below the attenuated voice frequencies and providing attenuating means for attenuating the ringing frequency supplied to the receiver and of attenuating all frequencies supplied to the ringing network except those included in the ringing signal.

DETAILED DESCRIPTION

Figure 1:
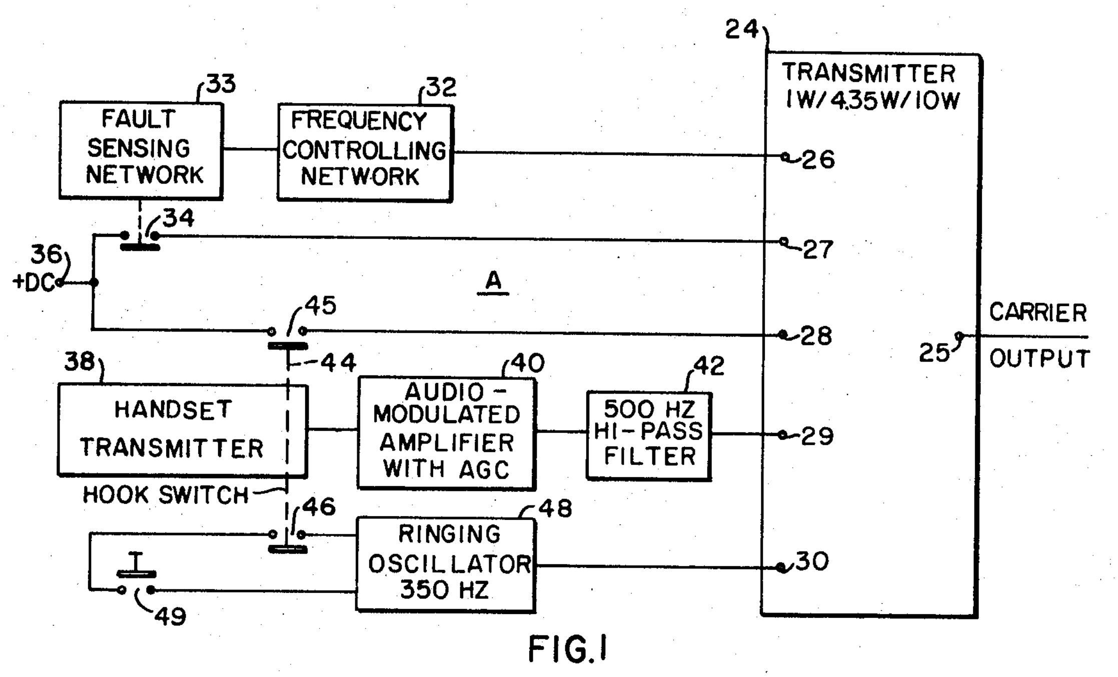
FIG. 1 is a block diagram of a transmitting network useful in practicing the invention.
Figure 2:
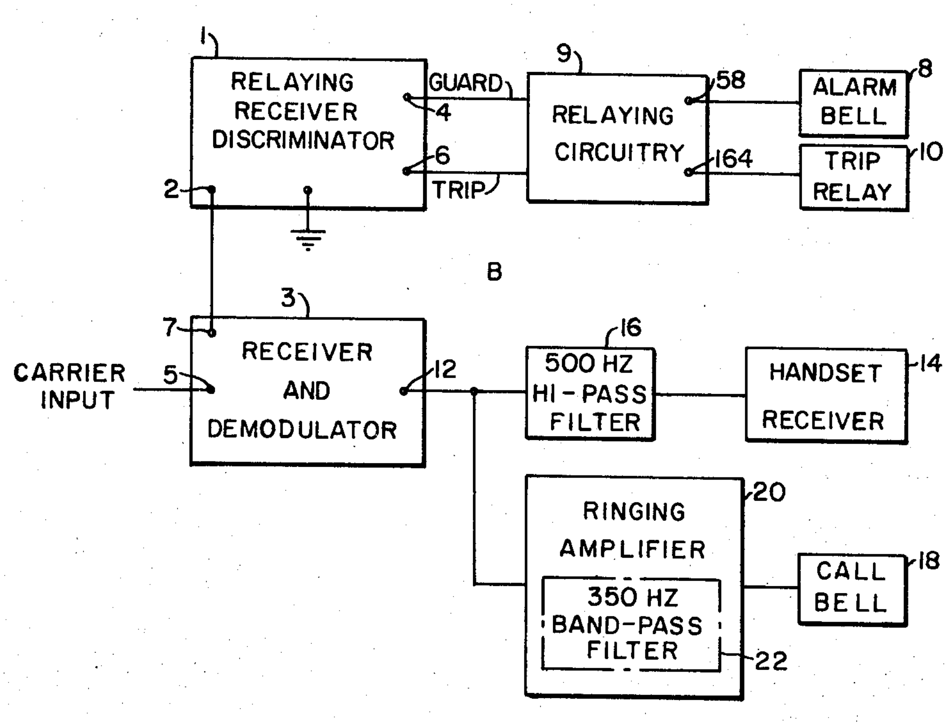
FIG. 2 is a block diagram of a receiving network useful in practicing the invention.

Referring to the drawings and more particularly FIG. 2, the reference characters A and B indicate generally transmitting and receiving networks respectively. The receiving network includes a relaying receiver discriminator network 1 having a signal input terminal 2 and a pair of output terminals 4 and 6 and a grounded terminal. The receiver 3 has a signal input terminal 5 and a pair of output terminals 7 and 12 which are energized respectively in response to the shift in frequency of the carrier and to the frequency at which the carrier is amplitude modulated. The discriminator 1 provides a positive output potential at its output terminal 4 when the carrier at guard frequency is being received by the input terminal of the receiver 3 and provides a positive output potential at its output terminal 6 when the carrier at trip frequency is being received at the receiver terminal 5. The discriminator terminals 4 and 6 actuate the relaying circuitry 9 which has its output terminals 58 and 164 connected respectively to an alarm bell 8 and trip relay 10. The boxes 8, 9 and 10 of this application include the boxes of FIG. 1 of U.S. Pat. No. 3,443,159 dated May 6, 1969 to C. T. Altfather. The second output terminal 12 of the receiver 3 energizes a handset receiver 14 through a 500 hertz hi-pass filter 16 and a call bell 18 through a ringing amplifier 20. The ringing amplifier 20 includes a 350 hertz band-pass filter 22.

The transmitting network includes a transmitter 24 having an output terminal 25 connected through a suitable carrier path with the input terminal 5 to supply an amplitude modulated frequency carrier wave to the receiver 3. The transmitter 24 is provided with a plurality of input terminals 26, 27, 28, 29 and 30. The frequency of the carrier wave transmitted by the transmitter 24 is controlled between a guard and a trip frequency in accordance with the signal supplied thereto from the frequency controlling network 32 in accordance with the signal supplied by a fault sensing network 33. The fault sensing network 33 is connected by suitable means, well known in the art, to one end portion of a transmission line to be protected. In the absence of a fault the sensing network 33 places the frequency controlling circuit 32 in its normal condition in which the carrier wave is transmitted at guard frequency. The fault sensing network also controls the output power of the transmitter 24 by means of a switch 34 which controls the connection of input terminal 27 to a terminal 36 energized from a positive DC source. In the event the fault sensing network 33 senses a fault, switch 34 closes and connects the input terminal 27 to the terminal 36. This potential supplied to terminal 27 causes an increase in the output power at terminal 25 from the minimum to the maximum output power as for example from 1 watt to 10 watts. Preferably the trip frequency is lower than the guard frequency and may for example have a difference of 200 hertz.

The output wave of the transmitter 24 may be amplitude modulated to transmit oral or voice signals to the receiver 3 for passage through the filter 16 to the handset receiver 14. For this purpose a handset transmitter 38 is connected to the input terminal 29 of the transmitter 24 through an audio modulated amplifier with automatic gain control 40 and a hi-pass filter 42. Associated with the handset transmitter 38 is a hook switch 44 which, when the handset transmitter 38 is removed from the usual hook, closes its contacts 45 and 46. Closure of the contacts 45 connects the plus DC terminal 36 to the transmitter input terminal 28. This causes the transmitter 24 to increase its transmitting power from the minimum power output to an intermediate power output which for example may be 4.35 watts.

The closure of the contacts 46 places the ringing oscillator 48 under control of a ringing switch 49. The output terminal of the ringing oscillator is connected to the transmitter input terminal 30. Closure of the switch 49 (with the contacts 46 of the hookswitch closed) energizes the oscillator 48 which in turn causes the transmitter 24 to amplitude modulate the carrier wave to transmit the ringing signal to the receiving network B. A suitable frequency for this modulation is 350 hertz. With the ringing oscillator 48 energized, the transmitter 24 transmits a 350 hertz amplitude modulated carrier signal to the receiver 3 which transmits a 350 hertz output signal from its output terminal 12 through the 350 hertz band-pass filter 22 causing the ringing amplifier 20 to energize the call bell 18. The 350 hertz output signal of the receiver is prevented from passing into the handset receiver 14 by the hi-pass filter 16 which, as indicated in FIG. 4, substantially attenuates the 350 hertz frequency but passes frequencies above 500 hertz with no appreciable attentuation to transmit audio or voice information when the operator speaks into the handset transmitter 38.

Figure 4:
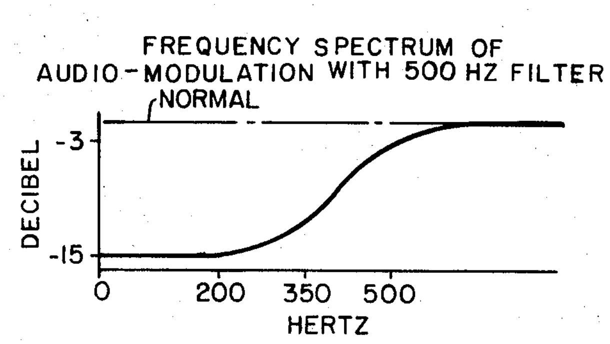
FIG. 4 is a diagram showing the frequency spectrum of a filter useful in the practice of the invention.
Figure 5:
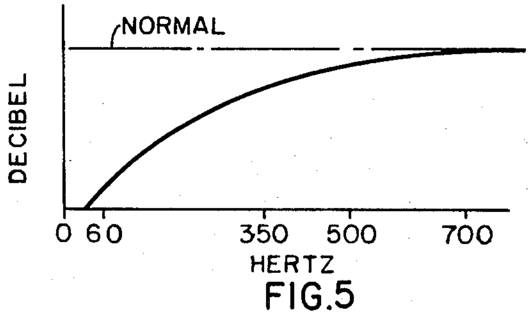
FIG. 5 is a curve showing the output frequency characteristics of the audio signal applied to the transmitter.

The filters 16 and 42 may be of substantially identical construction and from an examination of FIG. 4 it will be apparent that only those signals above 500 hertz frequency effectively audio modulate the output carrier wave of the transmitter 24. Because of the substantial attenuation of frequencies up to and beyond 350 hertz, the carrier wave will be devoid of spurious signals which might otherwise operate the discriminator 1 and falsely actuate the relaying circuitry 9 to cause a possible false trip of or failure to trip of the trip relay 10.

Figure 3:
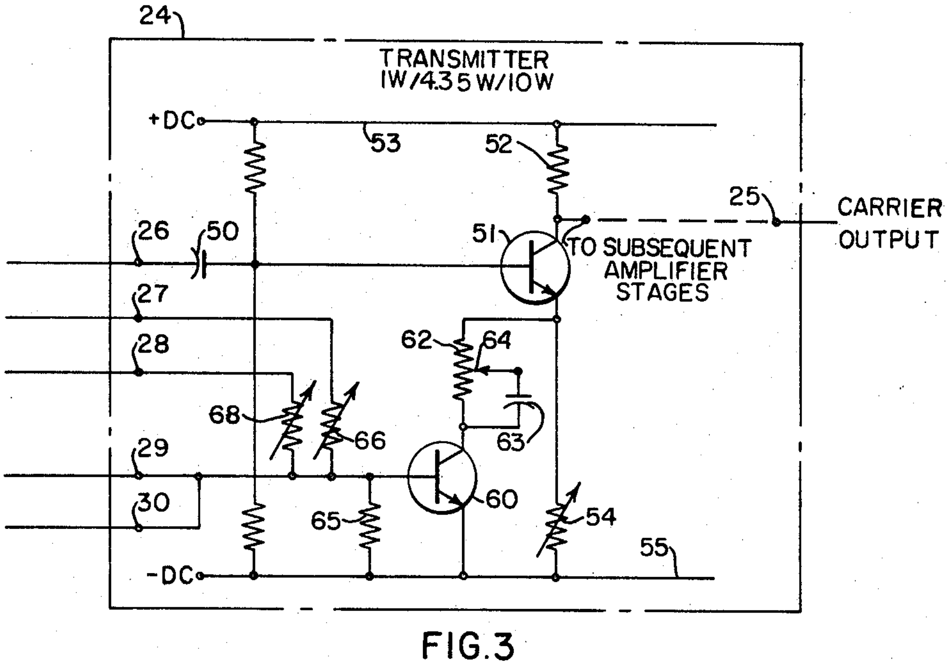
FIG. 3 is a partial schematic of a transmitter useful in the network of FIG. 1.

FIG. 3 illustrates fragmentarily the transmitter 24 which will frequency modulate its carrier output wave in response to a frequency shift signal applied to the input terminal 26. The transmitter 24 will amplitude modulate its carrier output wave by means of signals applied to its input terminals 29 and 30. More particularly the signals applied to the input terminal 26 from network 32 pass through a capacitor 50 to the base of a transistor 51 having its collector connected through a suitable resistor 52 to a positive potential bus 53 and is emitter connected through a resistor 54 to the negative DC bus 55. The carrier frequency signal so produced may be further amplified by suitable circuitry (not shown) and applied to the output terminal 25. The input terminals 27, 28, 29 and 30 are each connected to the base of a transistor 60; the connection of the terminals 27 and 28 being through resistors 66 and 68 respectively. The transistor 60 has its collector connected through the resistor element of a potentiometer 62 to the emitter of the transistor 51 and its emitter directly connected to the negative bus 55. A capacitor 63 is connected in shunt with a desired portion of the potentiometer 62 by the movable arm 64. Resistor 65 connects the base of the transistor 60 to the negative bus 55. With this arrangement the signals applied to the input terminals 29 and 30 will amplitude modulate the carrier output of the transmitter.

The minimum output power of the non-amplitude modulated carrier delivered by the transmitter 24 is determined by the strength of the input signal supplied by the network 32. This is regulated in any desired manner such that with the terminals 27–30 deenergized the output power is at the desired minimum magnitude which, as indicated above, may be 1 watt. The output power of the transmitted non-amplitude modulated carrier may be increased by rendering the transistor 60 conducting. With the terminal 27 connected to the terminal 36, the resistor 66 is adjusted to bring the transistor 60 into a highly saturated condition. Thereafter the potentiometer arm 64 is adjusted to increase the power of the non-amplitude modulated carrier wave to the desired maximum magnitude which as indicated above may be 10 watts. It will be understood that in the event of the occurence of a fault, the sensing network 33 is actuated to close the switch 34 to provide the 10 watt output. The network 33 also actuated the network 32 to charge its output frequency from guard to trip frequency. This will occur regardless of any use of the audio modulating operations. With the terminal 27 deenergized, the terminal 28 is connected to the terminal 36 and the resistor 68 is adjusted to bring the power of the non-amplitude modulated carrier wave to an intermediate value which, as indicated above, may be 4 watts or slightly greater as for example 4.34 watts. Since the completely non-conductive condition of the transistor results in the minimum output power of the transmitter, the output power of the transmitter can never be reduced below the 1 watt minimum and any degree of amplitude modulation of the carrier signal can never result in "a loss of signal" condition in the relaying circuitry 9. As discussed more fully in the said Altfather patent this could result in a false actuation of the alarm belt 8 or in a failure of the circuitry 9 to energize the trip relay if the guard signal was not present within the prescribed interval before the appearance of the trip signal output of the receiver terminal 6.

The circuitry illustrated in FIG. 3 is merely illustrative of a transmitter 24 which may be used in connection with my invention. The specific circuit is not needed for the practice of this invention and in fact was derived by us from others and is not a part of our invention.

Figure 6:
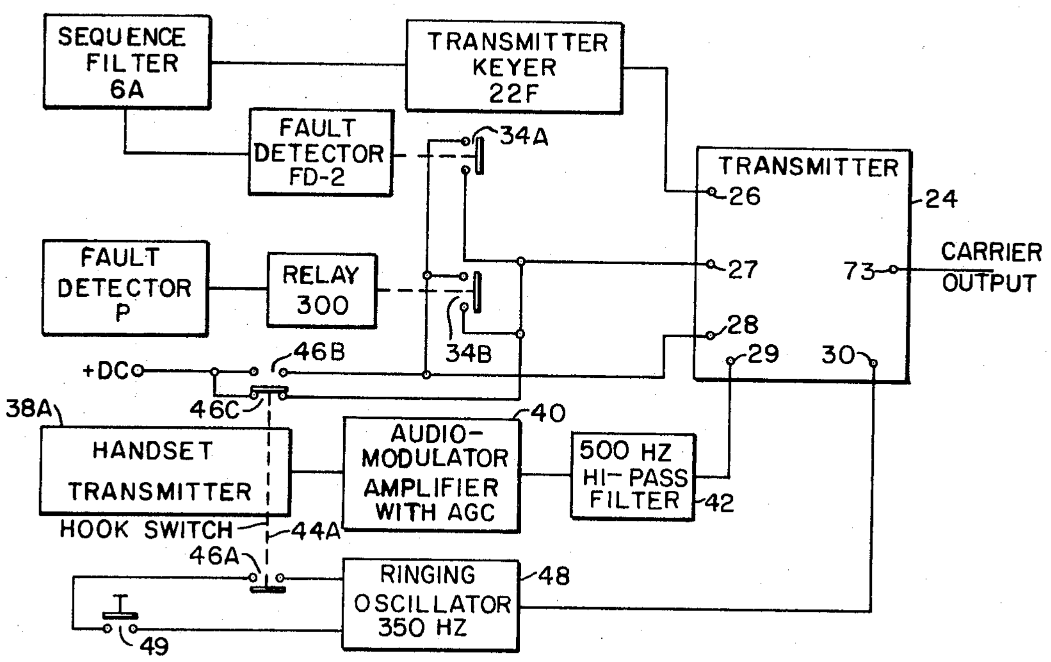
FIG. 6 is a block diagram illustrating a modified form of transmitting network useful in the practice of the invention; and, FIG. 7 is a block diagram showing a receiving network useful with the transmitting network of FIG. 6 for the practice of the invention.
Figure 7:
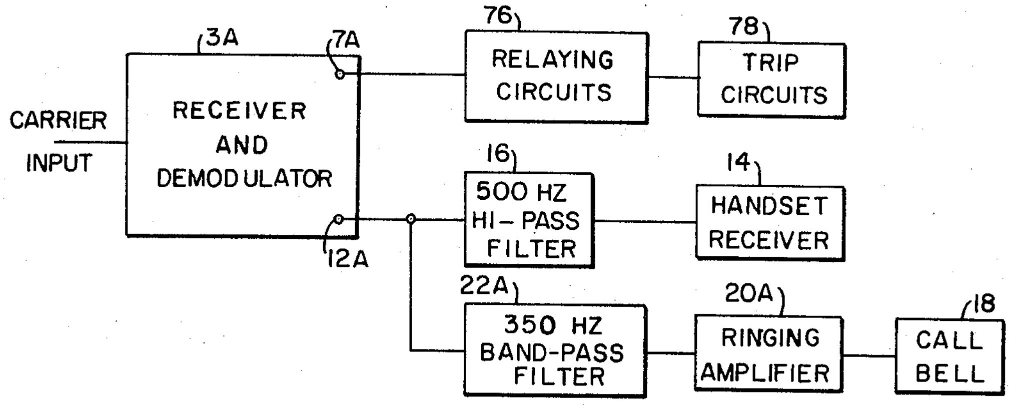

The relaying apparatus as depicted in FIGS. 6 and 7 includes a sequence filter 6A which actuates a frequency transmitter keyer or shifting network 22F which continually causes the carrier wave transmitted by the transmitter 24A to alternate between mark and space frequencies, similarly to that described in the copending application of George D. Rockefeller, Jr., Ser. No. 837,242, now U.S. Pat. No. 3,590,324, filed June 27, 1969 and assigned to the same assignee as is this application. FIG. 8 of the Rockefeller disclosure illustrates the apparatus at one end of a protected section of a power transmission line. Similar apparatus will be located at the other end of the protected section. It will be understood that the transmitter portion of one apparatus located at a first end of the protected section of the transmission line (FIG. 6 hereof) cooperates with the receiver portion of the apparatus located at the other end of the line (FIG. 7 hereof).

As is more fully described in the said Rockefeller disclosure, the transmitter 24F is alternately operated between a first or space frequency and a second or mark frequency by means of the sequence filter 6A through the low pass filter 10F and transmitter keyer 22F. The blocks of this application correspond generally to the like numbered blocks of the said Rockefeller application and will be located at and actuated by a transformer array 8 at the first or remote end of the section of the transmission line being protected.

The receiving apparatus shown in FIG. 7 hereof corresponds in many respects to the receiver and its cooperating elements for actuation of the trip coil and relay 52 and 50 of Rockefeller and would be located at the other or local end of the transmission line being protected. The apparatus at the local end includes a receiver 3A connected to actuate relaying circuits 76 similar to those found in Rockefeller and which in the event of an internal fault in the protected section actuate the trip circuits 78. The receiver 3A demodulates the received carrier wave and provides a first output signal at its output terminal 7A derived from the frequency shifted carrier wave and a second output signal at its output terminal 12A derived from the amplitude modulation of the carrier wave.

In order to transmit oral or voice information from the remote station to the local station over the same carrier wave, the transmitting network of FIG. 6 is provided with a handset transmitter 38A, an audio modulating amplifier with automatic gain control 40 and a 500 hertz hi-pass filter 42. The signal produced by the transmitter 38A, after amplification and filtering, is supplied to an input terminal 29 of the transmitter 24. The handset transmitter 38A is provided with a hook switch 44A which has normally open contacts 46A and 46B and normally closed contacts 46A together with a ringing switch 49 control the ringing oscillator 48. The oscillator 48 provides a 350 hertz signal to terminal 30 whereby the output wave of the transmitter 24 is amplitude modulated.

The transmitter 24 of FIG. 6 normally transmitts its mark and spare signals at 10 watts because of the plus DC supplied to the terminal 27 by the normally closed contacts 46C. When the handset transmitter 38A is used the hook switch 44A closes the contacts 46A and 46B. Closure of contacts 46A places the ringing oscillator 48 under control of switch 40. The closure of contacts 46B and the opening of contacts 46C energizer input terminal 28 and deenergizes the terminal so that the transmitter 24 will transmit at the 4.35 watt output for use in transmitting an audio frequency amplitude modulated carrier wave. In the event of the occurence of a fault at least one of the fault detectors FD–2 or P will be actuated and close at least one of the sets of contacts 34A and 34B. Upon closure of either or both of these sets of contacts 34A and 34B, the input terminal 27 will again be energized and the transmitter will transmit its relaying signal at the 10 watt output.

The receiver 3A when receiving the 350 hertz amplitude modulated signal supplies a signal of this frequency from its output terminal 12A through the 350 hertz band-pass filter 22A to the ringing amplifier 20A which is then effective to energize the call bell 18. The 350 hertz signal is prevented from passing to the handset receiver 14 by the 500 hertz hi-pass filter 16.

Audio information from the handset transmitter 38A is amplified with automatic gain control in the audio modulator amplifier, filtered by 500 hertz hi-pass filter 42 and supplied to the input terminal 30 of the transmitter 24. The hi-pass filter 42 removes or substantially attenuates the frequencies below 500 hertz. The resulting amplitude modulated signal transmitted by the transmitter 24 is received by the receiver 3A. The receiver 3A demodulates the amplitude modulated signal, provides an output at its output terminal 12A which is substantially the same as that supplied to the transmitter 24. This signal passes through the filter 16 and actuates the handset receiver 14.

The apparatus of FIGS. 6 and 7 unlike that of FIGS. 1 and 2 is continually frequency modulated between its space and its mark frequencies at a rate as determined by the alternating frequency of the transmission line with which the apparatus is associated. The relaying circuits 76 compare the phase relationship of the mark and space signals received from the transmitter 24 (FIG. 6) with the information provided by the relaying circuits 76 so that when a fault occurs within the protected section of the transmission line, the trip circuits 78 are actuated to open a breaker (not shown). The relaying circuits and trip circuits operate in the manner set forth in more particularity in Rockefeller.

It will be apparent that there has been disclosed two forms of a relaying apparatus by which a frequency modulated relaying carrier signal may be audio modulated for supplying voice information over the relaying circuit without any interference with the relaying operation of the frequency modulated carrier.

What is claimed and is desired to be secured by United States Letters Patent is as follows:

1. A relaying system comprising a fault sensing network having a first output and a second output, a transmitter, said transmitter including circuitry to provide an output signal at first and second frequencies, said transmitter further including circuitry to amplitude modulate said output signal at both said first and second frequencies, means connecting said transmitter to said fault sensing network whereby said first output will cause said transmitter to transmit said signal at a minimum power magnitude and whereby said second output will cause said transmitter to transmit said signal at a maximum power magnitude, circuit means connected to said transmitter and effective to cause said transmitter to modulate said signal as a function of its output frequency, said circuit means actuating said transmitter to transmit said signal at a power magnitude above said minimum magnitude and to limit the modulation of said signal thereby to prevent the power magnitude of said signal from reaching a value less than said minimum power magnitude.

2. The combination of claim 1 in which said circuit means attenuates all frequencies below a desired minimum frequency whereby to attenuate side band frequencies of said signal.

3. The combination of claim 2 in which the magnitude of said attenuated side band frequencies is at least equal to the magnitude of the difference in frequency between said first frequency and said second frequency.

4. The combination of claim 3 in which there is provided a source of ringing frequency connected to said transmitter and effective to modulate said signal, a receiver adapted to demodulate said amplitude modulated portion of said signal to provide an output signal derived from said signal portion, an audio frequency sensitive device connected to said circuit means and effective to control the output frequency of said circuit means, a call device, an audio frequency output device, and circuit means connecting said receiver to said call device and to said audio frequency output device, said just-named circuit means including means to attenuate all frequencies supplied to said call device except said ringing frequency and to attenuate said ringing frequency from the frequencies supplied to said audio frequency output device.

5. A relaying system comprising a transmitting network having first and second input means and an output means, said transmitting network being effective to provide a frequency modulated output signal at its output means in response to an alterable signal supplied to said first input means and to amplitude modulate said output signal in response to a variable signal supplied to said second input means, said network including attenuating means attenuating the frequencies below a minimum predetermined frequency at which said signal is amplitude modulated, a receiving network having network having an input means adapted to receive said output signal and having first and second output means, said receiving network being effective to provide an output at its said first output means which is derived from the frequency modulated portions of said signal when supplied to its said input means and to provide an output at its said second output means which is derived from the amplitude modulated portions of the signal supplied to its said input means, the magnitude of the frequency change of said frequency modulated output signal being no greater than the maximum frequency which is attenuated by said attenuating means.

6. The combination of claim 5 in which there is provided a ringing frequency source, means connecting said ringing source to said transmitting network, said ringing source being effective to amplitude modulate said output signal of said transmitting network at a frequency which is intermediate said maximum attenuated frequency and said magnitude of the frequency change of said frequency modulation.

7. The combination of claim 6 in which there is provided a call device connected to said receiving network and energized thereby in response to the reception by said receiving network of said output signal when amplitude modulated by said ringing source, a receiving device connected to said second output means of said receiving network for energization by said output of said output means, said receiving network further including means attenuating said frequencies of said output of said second output means which is supplied to said receiving device which are of the same magnitude as provided by said ringing frequency source.

8. The combination of claim 7 in which means is provided to attenuate all frequencies which are supplied to said device except those at the frequency of said ringing frequency source.

9. The combination of claim 6 in which there is provided a call device connected to said receiving network and energized thereby in response to the reception by said receiving network of said output signal when amplitude modulated by said ringing source, said receiving network further including means attenuating said frequencies which are supplied to said call device which are not of the same magnitude as provided by said ringing frequency source.

10. The combination of claim 5 in which said transmitting network is provided with power controlling means controlling the power of said output signal, said power controlling means being effective to maintain a first power magnitude of said output signal when said alterable signal supplied to said first input means has a first characteristic and to maintain a second power magnitude of said output signal when said alterable signal supplied to said first input means has a second characteristic, said power controlling means further being effective to limit the variations in the magnitude of said power of said output signal to magnitudes intermediate said first and second power magnitudes when said variable signal is supplied to said second input means.

11. An apparatus of the character described comprising a transmitting network having first and second input means and an output means, said transmitting network being effective to provide a frequency modulated output signal at its output means in response to an attenuable signal supplied to said first input means and to amplitude modulate said output signal in response to a variable signal supplied to said second input means, said network including attenuating means attenuating the frequencies at which said signal is amplitude modulated below a minimum predetermined frequency, the magnitude of the frequency change of said frequency modulated output signal being no greater than the maximum frequency which is attenuated by said attenuating means.

12. The combination of claim 11 in which said attenuating means attenuates to a first minimum magnitude all of those frequencies at which said signal is amplitude modulated which are less than the difference in the change in frequency of said output signal caused by said alterable signal, a ringing oscillator connected to said transmitting network and effective to amplitude modulate said output signal at a desired frequency, said desired frequency being greater than said first minimum magnitude, said attenuating means being effective to attenuate the amplitude modulation of said output signal at said desired frequency.

13. The combination of claim 12 in which said attenuating means comprises a filter in which said first minimum magnitude of attenuation is in the range of 15 db. and in which the magnitude of attenuation of said desired frequency is in the range of not less than 3 db.

14. The combination of claim 13 in which said predetermined frequency change is in the range of 200 Hz and said desired frequency is in the range of a frequency of 350 Hz, said filter further attentuating all signals up to a frequency of 500 Hz not less than a range of 3 db.

15. The combination of claim 11 in which said transmitting network is provided with power controlling means controlling the power of said output signal, said power controlling means being effective to maintain a first power magnitude of said output signal when said alterable signal supplied to said first input has a first characteristic and to maintain a second power magnitude of said output signal when said alterable signal supplied to said first input means has a second characteristic, said power controlling means further being effective to limit the variation in the magnitude of said power of said output signal to magnitudes intermediate said first and second power magnitudes when said variable signal is supplied to said second input means.

16. An apparatus of the character describing comprising a receiving network having an input means adapted to receive an output signal which is frequency modulated between first and second frequencies and which is amplitude modulated, said network having first and second output means, said receiving network being effective to provide an output at its said first output means which is derived from the frequency modulation of said signal between first and second frequencies and to provide an output at its said second output means which is derived from the amplitude modulation of said signal, an audio frequency responsive device connected to said second output means, signal attenuating means connected intermediate said second output means and said audio frequency responsive device, the magnitude of the frequency attenuated by said attenutating means being not less than the change of said frequency modulated wave between said first and second frequencies.

17. The combination of claim 16 in which there is provided a call bell, a band-pass filter, means connecting said call bell to said second output means and including said band-pass filter, said attenuating means comprising a high-pass filter, said band-pass filter being tuned to a frequency greater than the difference in frequency between said first and second frequencies, said high-pass filter being tuned to attenuate frequencies at least as great as the frequency to which said band-pass filter is tuned.

* * * * *